US012360315B2

(12) United States Patent
Liu et al.

(10) Patent No.: US 12,360,315 B2
(45) Date of Patent: Jul. 15, 2025

(54) PLASMONIC NANOPARTICLE LAYERS WITH CONTROLLED ORIENTATION

(71) Applicant: Virginia Tech Intellectual Properties, Inc., Blacksburg, VA (US)

(72) Inventors: Guoliang Liu, Blacksburg, VA (US); Assad U. Khan, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/890,115

(22) Filed: Aug. 17, 2022

(65) Prior Publication Data

US 2023/0084516 A1 Mar. 16, 2023

Related U.S. Application Data

(63) Continuation of application No. 16/473,458, filed as application No. PCT/US2018/014747 on Jan. 22, 2018, now abandoned.

(Continued)

(51) Int. Cl.

| | |
|---|---|
| ***B32B 5/16*** | (2006.01) |
| ***B32B 27/14*** | (2006.01) |
| ***B32B 27/18*** | (2006.01) |
| ***C23C 28/00*** | (2006.01) |
| ***G02B 6/122*** | (2006.01) |
| ***G02B 6/132*** | (2006.01) |

(Continued)

(52) U.S. Cl.

CPC .............. *G02B 6/1226* (2013.01); *B32B 5/16* (2013.01); *B32B 27/14* (2013.01); *B32B 27/18* (2013.01); *G02B 6/132* (2013.01); *G02B 26/02* (2013.01); *B32B 7/025* (2019.01); *B82Y 20/00* (2013.01); *B82Y 30/00* (2013.01); *G02B 2207/101* (2013.01); *Y10T 428/12014* (2015.01); *Y10T 428/12028* (2015.01); *Y10T 428/12049* (2015.01)

(58) Field of Classification Search

CPC .............................. G02B 6/1226; C23C 28/30

See application file for complete search history.

(56) References Cited

U.S. PATENT DOCUMENTS

| | | | | |
|---|---|---|---|---|
| 9,322,823 | B2 * | 4/2016 | Denomme | G01N 21/554 |
| 10,961,564 | B2 * | 3/2021 | Shih | G01N 21/648 |

(Continued)

FOREIGN PATENT DOCUMENTS

| | | | |
|---|---|---|---|
| CN | 1978096 | A | 6/2007 |
| JP | 2006208057 | A | 8/2006 |
| JP | 2016004721 | A | 1/2016 |

OTHER PUBLICATIONS

NanoComposix. Color Engineering. https://nanocopsix.com/pages/color-engineering/. Apr. 30, 2014 (Year: 2014).*

(Continued)

*Primary Examiner* — Cachet I Proctor

(74) *Attorney, Agent, or Firm* — Perilla Knox & Hildebrandt LLP; Jonathan A. Paulis

(57) ABSTRACT

A method of making an article comprising one or more layers of plasmonic nanoparticles located between opposing layers of dielectric materials and an article comprising one or more layers of plasmonic nanoparticles located between opposing layers of dielectric materials.

19 Claims, 16 Drawing Sheets

Related U.S. Application Data

(60) Provisional application No. 62/448,581, filed on Jan. 20, 2017.

(51) Int. Cl.

| | |
|---|---|
| ***G02B 26/02*** | (2006.01) |
| *B32B 7/025* | (2019.01) |
| *B82Y 20/00* | (2011.01) |
| *B82Y 30/00* | (2011.01) |

(56) References Cited

U.S. PATENT DOCUMENTS

| | | | | |
|---|---|---|---|---|
| 2005/0227063 | A1* | 10/2005 | Lawandy | C09D 11/50 428/323 |
| 2005/0250243 | A1* | 11/2005 | Bonnell | B82Y 30/00 438/57 |
| 2006/0274315 | A1* | 12/2006 | Saito | G01N 21/554 356/445 |
| 2011/0109821 | A1* | 5/2011 | Tang | G02F 1/23 349/32 |
| 2011/0109854 | A1* | 5/2011 | Tang | G02F 1/195 349/117 |
| 2011/0116168 | A1* | 5/2011 | Nikoobakht | G02B 26/02 977/932 |
| 2013/0258456 | A1* | 10/2013 | Hashimura | G02B 5/206 359/359 |
| 2014/0234226 | A1* | 8/2014 | Mahmoudi | A61K 49/1863 424/9.323 |
| 2014/0276248 | A1* | 9/2014 | Hall | A61N 1/0432 604/20 |
| 2015/0034160 | A1* | 2/2015 | Wu | H01L 31/0445 136/265 |
| 2015/0212004 | A1 | 7/2015 | Mano | |
| 2016/0011109 | A1* | 1/2016 | Kim | H01J 37/3255 427/569 |
| 2016/0030977 | A1* | 2/2016 | Grunlan | C09D 179/02 427/407.1 |
| 2016/0282341 | A1* | 9/2016 | Singamaneni | G01N 33/553 |

OTHER PUBLICATIONS

Langille et al. Plasmon Mediated Syntheses of Metallic Nanostructures. Angewandte Chem Int.Ed 52. pp. 13910-13940. 2013 (Year : 2013).*

Kim et al. Surface Potential of Au Nanoparticles Affected by Layer-by-Layer Deposition of Polyelectrolytes: A Surface-Enhanced Raman Scattering Study. J. Phys. Chem. C 2010, 114, 9917-9922 (Year: 2010).*

Placido et al. Electroactive Layer-by-Layer Plasmonic Architectures Based on AuNanorods. | Langmuir 2014, 30, 2608-2618 (Year: 2014).*

Budy et al. Polymer mediated layer-by-layer assembly of different shaped gold nanoparticles.J Colloid Interface Sci . Feb. 1, 2017:487:336-347. (Year: 2017).*

United States International Searching Authority; International Search Report & Written Opinion for PCT/US2018/014747; Mar. 22, 2018; 14 pages; Alexandria, VA; US.

NANOCOMPOSIZ; Color engineering, Apr. 30, 2014 [retrieved on Mar. 2, 2018]; Retrieve from the Internet: https://web.archive.org/web/20140430045440/https://nanocomposix.com/pages/color-engineering.

Chinese Patent Office; Office Action issued for corresponding Chinese Application No. 2018800087797.4; Mar. 3, 2021; 9 pages.

Japanese Patent Office; Office Action issued for corresponding Japanese Application No. 2019-539184; Sep. 11, 2020; 10 pages.

Japanese Patent Office; Office Action issued for corresponding Japanese Application No. 2019-539184; Aug. 27, 2021; 9 pages.

Chinese Patent Office; Office Action issued for corresponding Chinese Application No. 2018800087797.4; Sep. 15, 2021; 24 pages.

Japanese Patent Office; Notice of Allowance issued for corresponding Japanese Application No. 2019-539184; May 9, 2022; 3 pages.

Chinese Patent Office; Office Action issued for corresponding Chinese Application No. 2018800087797.4; Feb. 10, 2022; 9 pages.

* cited by examiner 100
100
PAH
100

100
PAH
100

100
110
PAH
100

100
120
121
122
123
PAH
124
100
125
n cycles

PLASMONIC NANOPARTICLE LAYERS WITH CONTROLLED ORIENTATION

RELATED APPLICATIONS

This application claims the benefit of U.S. Provisional Application No. 62/448,581, filed Jan. 20, 2017.

BACKGROUND OF THE INVENTION

Plasmonic nanoparticles are particles whose electron density may be coupled with electromagnetic radiation of wavelengths that are far larger than the particle due to the nature of the dielectric-metal interface between the medium and the particles. Articles incorporating plasmonic nanoparticles have use in applications ranging from solar cells, sensing, spectroscopy to cancer treatment.

BRIEF SUMMARY OF THE INVENTION

In one embodiment, the present invention provides methods that provide articles having plasmonic nanoparticles by applying the particles using the layer-by-layer technique. The method results in the formation of composite films of polyelectrolytes and plasmonic nanoparticles.

In other embodiments, the present invention provides methods that form nanoprisms having plasmonic properties.

In other embodiments, the present invention provides a layer of plasmonic nanoparticles located between opposing layers of dielectric materials. The plasmonic nanoparticles may be at least two different metals, have different plasmonic resonance wavelengths.

In other embodiments, the plasmonic nanoparticles may be configured to absorb, reflect, scatter, and transmit light.

In other embodiments, the layer of plasmonic nanoparticles may be comprised of oriented nanoparticles, randomly oriented nanoparticles, or combinations thereof.

In other embodiments, the present invention provides an article comprising a plurality of layers of plasmonic nanoparticles located between opposing layers of dielectric materials. In other embodiments, at least two layers have plasmonic nanoparticles having different plasmon resonance wavelengths. In other embodiments, at least two layers have plasmonic nanoparticles having the same plasmon resonance wavelengths.

In yet other embodiments, each layer has plasmonic nanoparticles configured to absorb, reflect, scatter, and transmit light.

In yet other embodiments, the layers of plasmonic nanoparticles are oriented parallel to substrate or layers, randomly oriented in all directions or has combinations thereof.

In other embodiments, the present invention provides an article comprising layers of nanoparticles wherein one of the layers has oriented plasmonic nanoparticles and at least one other layer has randomly oriented nanoparticles.

In other embodiments, the present invention provides an article comprising a plurality of layers of plasmonic nanoparticles sandwiched between layers of dielectric materials which may have different thicknesses, the same thicknesses or combinations thereof.

In other embodiments, the present invention provides an article comprising a plurality of layers wherein at least two layers of plasmonic nanoparticles have different surface densities, the same surface densities or combinations thereof.

In other embodiments, the dielectric material is a polymer.

In other embodiments, the present invention provides an article comprising a plurality of layers of plasmonic nanoparticles wherein at least two layers of the plasmonic nanoparticles have plasmonic nanoparticles having the same or different metals.

In other embodiments, the present invention provides an article comprising a plurality of layers of plasmonic nanoparticles wherein at least two layers of the plasmonic nanoparticles having the same or different metal oxides.

In other embodiments, the present invention provides an article comprising a plurality of layers of plasmonic nanoparticles wherein at least one layer of the plasmonic nanoparticles has metal plasmonic nanoparticles and another layer of the plasmonic nanoparticles has metal oxide plasmonic nanoparticles.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

As shown in FIGS. 1A-1D, some embodiments of the present invention provide a layer-by-layer technique used to prepare composite films of polyelectrolytes and plasmonic nanoparticles on articles or substrates. In a preferred embodiment, Ag plasmonic nanoparticles may be used.

Figures 1A, 1B, 1C, 1D:
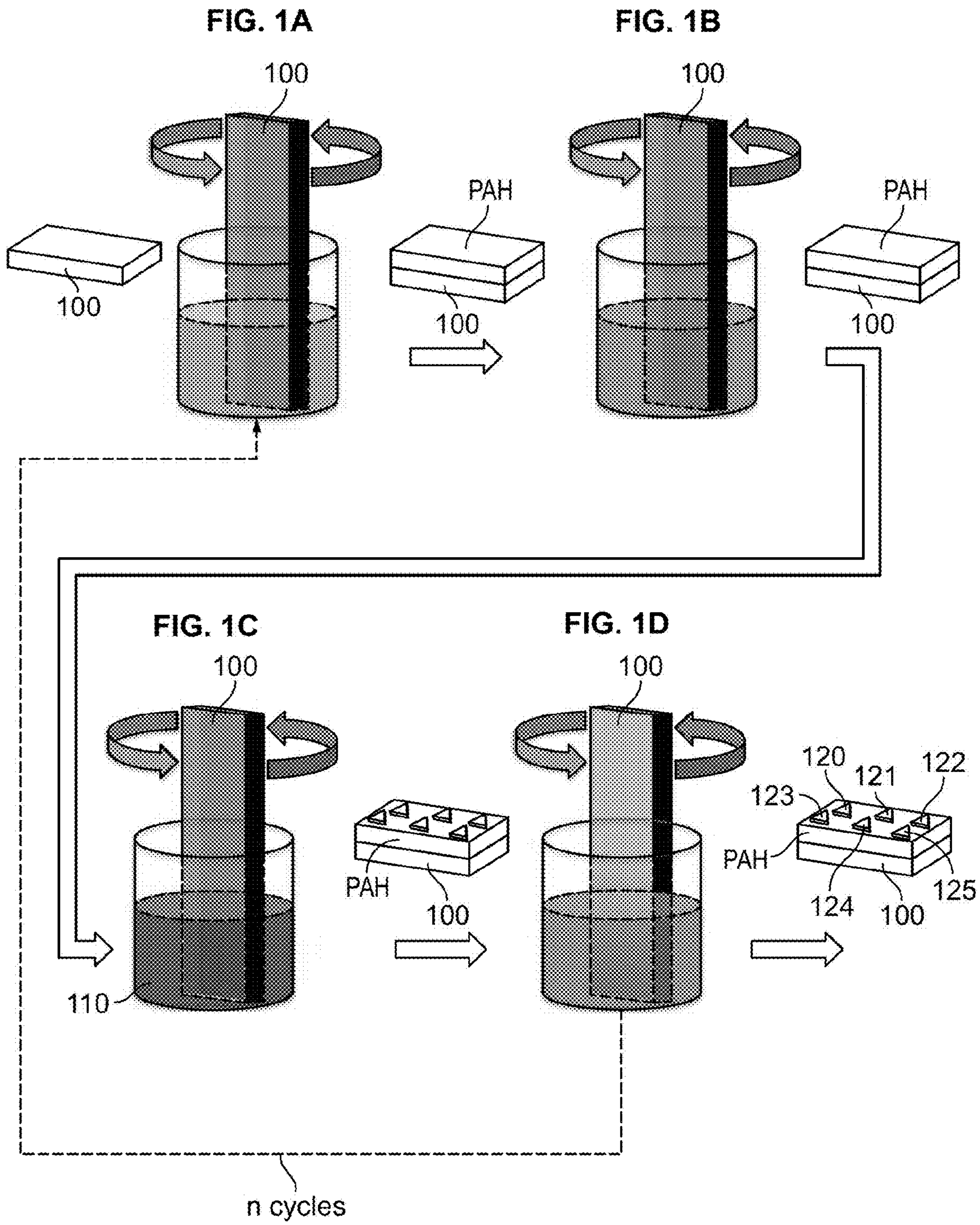
FIGS. 1A, 1B, 1C and 1D show a layer-by-layer technique used to prepare composite films of polyelectrolytes and plasmonic nanoparticles on articles or substrates, as used in one embodiment of the present invention.

As shown for one embodiment, a substrate or article 100, which may be a clean glass slide, is first dipped in dilute solution (10 mM) of polyelectrolyte solution (FIG. 1A) followed by rinsing step with deionized (DI) water (FIG. 1B). It is then dipped in nanoparticles solution 110 for various times (FIG. 1C) and rinsed afterwards with DI water (Figure D).

The use of polyelectrolytes in thin films is known to those of skill in the art for one embodiment poly (allylamine hydrochloride) (PAH) cationic polymer and poly (acrylic acid) (PAA) anionic polymer were used for multiplayer thin film fabrication resulting in the deposition of plasmonic nanoparticles 120-124 as shown in FIG. 1D.

The Si—O on glass slides or other substrates provides a negative charge and PAH which is cationic polymer can electrostatically attach to the glass slides or substrates. Strong oxidation agents like RCA can also be used to increase the negative charge on glass slides or substrates. PAH can saturate the surface with a monolayer, hence giving rise to a positive surface charge overall. The Ag nanoparticles may be negatively charged. In other embodiments, the Ag nanoparticles are citrate-capped and hence negatively charged and can be electrostatically deposited on the PAH layer. The glass slides or substrates may be rinsed with water between all deposition steps.

Figure 3A:
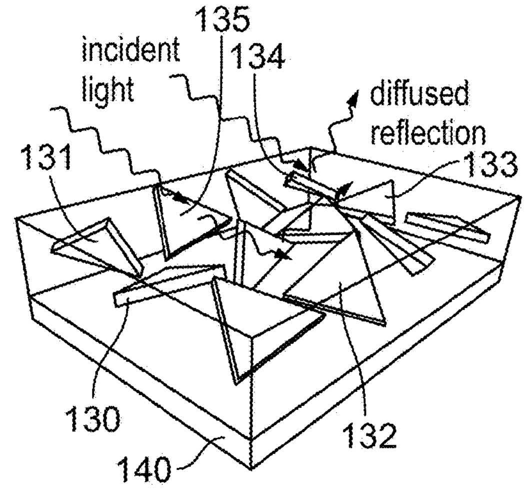
FIGS. 3A, 3B and 3C are schemes for randomly distributed nanoplates in polymer matrix, corresponding optical image of the film and film cross-section SEM image showing nanoparticle.
Figure 3B:
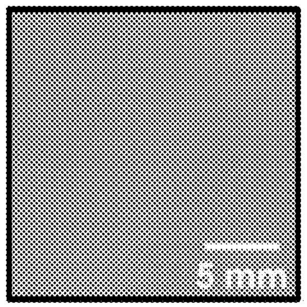
Figure 3C:
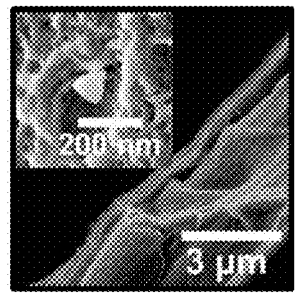
Figure 3D:
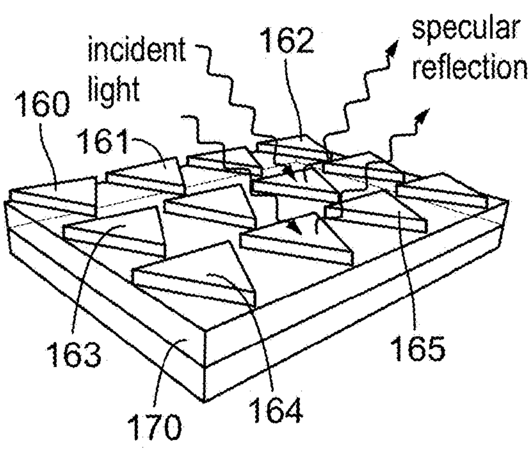
FIGS. 3D, 3E and 3F are schemes for oriented nanoplates on substrate prepared by layer-by-layer assembly, corresponding optical image and SEM image showing most particles are lying flat on the substrate for an embodiment of the present invention.
Figure 3E:
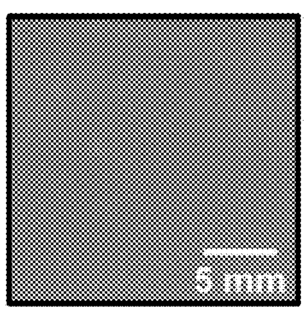
Figure 3F:
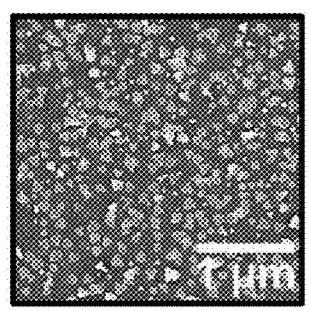
Figure 3G:
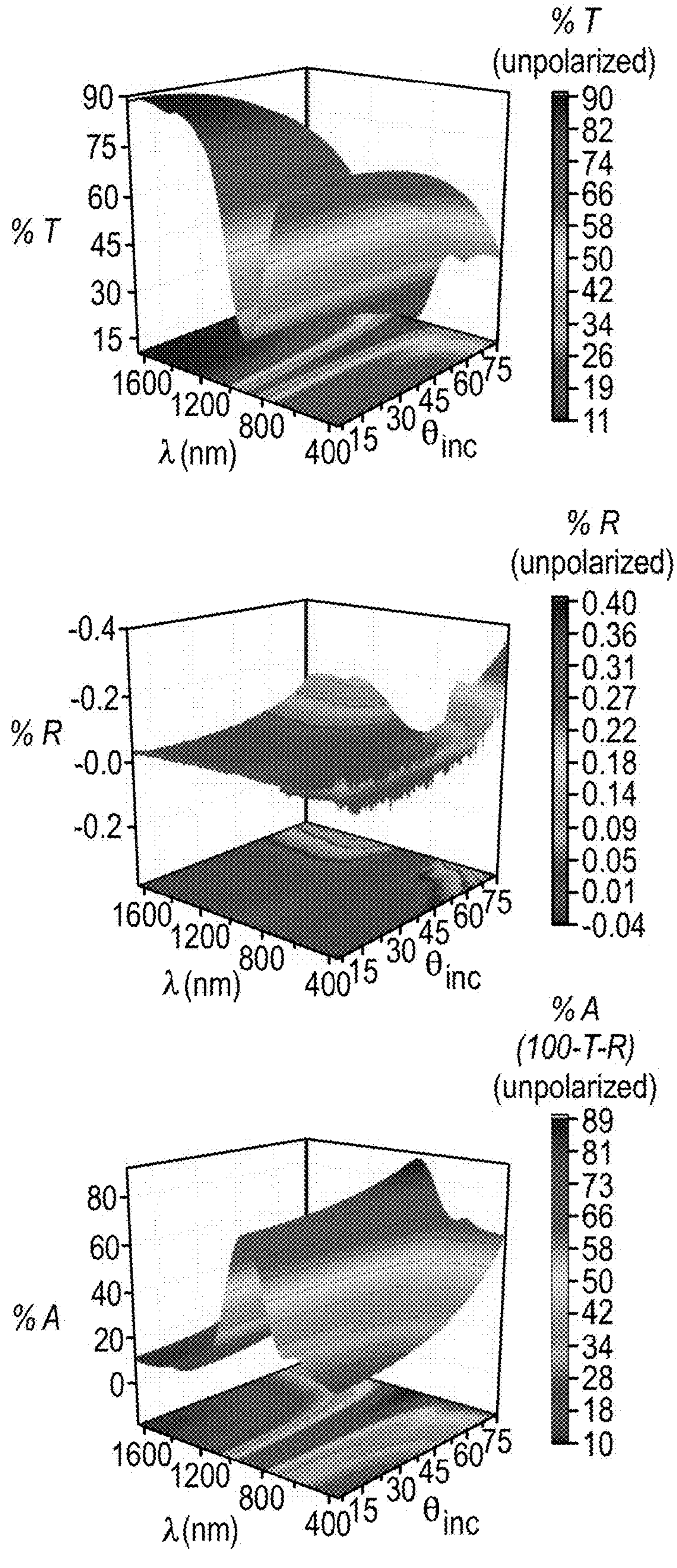
FIGS. 3G and 3H show % T, % R, and % A spectrum plotted as a function of wavelength (400-2000 nm) at different angles (6° to 75°) at 1° increment for an embodiment of the present invention.
Figure 3H:
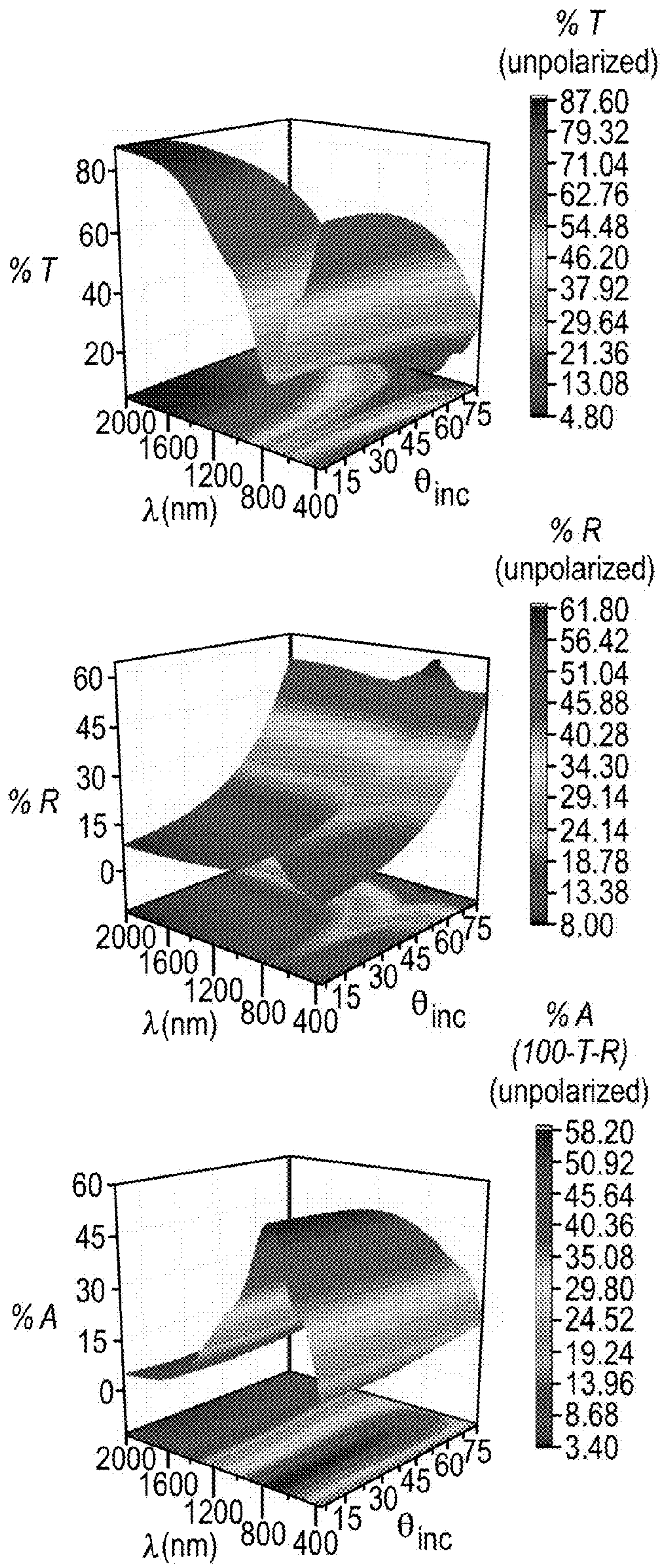

Orientation of plasmonic nanoplates have a prominent effect on their optical properties. FIGS. 3A-F show two different cases where the nanoparticles are either randomly distributed in a PMMA matrix or they are oriented on substrate using PAH. The optical properties in FIG. 3G-H show that the % reflectance is minimum for randomly distributed nanoparticles (G) while it increases for the oriented nanoparticles (H). As shown in FIG. 3A, plasmonic nanoparticles 130-135 are randomly oriented in all directions to layer 140. As shown in FIG. 3D, plasmonic nanoparticles 160-165 are oriented parallel to layer 170.

Figure 4A:
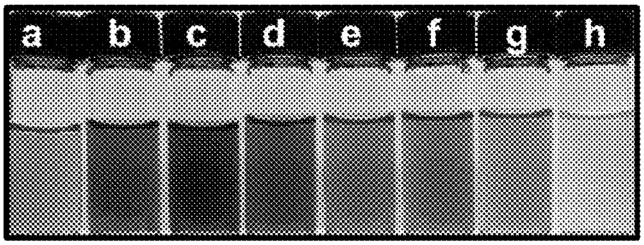
FIG. 4A shows an optical image of colloidal solution of Ag nanoparticles of increasing sizes from a-h in accordance with an embodiment of the present invention.
Figure 4B:
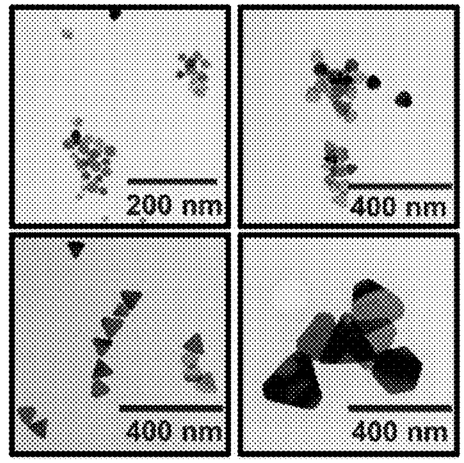
FIG. 4B shows representative TEM images of the colloidal nanoparticles where the size can be seen increasing for an embodiment of the present invention.
Figure 4C:
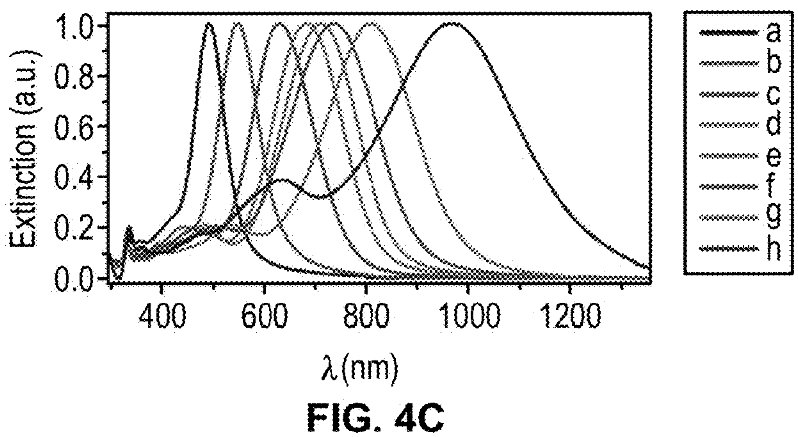
FIG. 4C shows extinction spectra of the corresponding nanoparticles in FIG. 4A for an embodiment of the present invention.

In a preferred embodiment, Ag nanoprisms were synthesized using seed mediated process in aqueous medium. FIGS. 4A and 4C show the optical image and extinction peaks of the colloidal solution. For plate like nanoparticles in the visible range (400-700 nm), sharp colors can be seen owing to the in-plane dipole. When the in-plane dipole is above 700 nm, it does not impart the intense color, instead light colors are observed because of the in-plane quadrupole peaks associated with plate like structures. The in-plane quadrupole is a characteristic of plate like nanoparticles. FIG. 4B shows a typical TEM images for selected nanoparticles and it was observed that majority of nanoparticles were prismatic in shape except the smaller nanoparticles which were more rounded.

Figure 2:
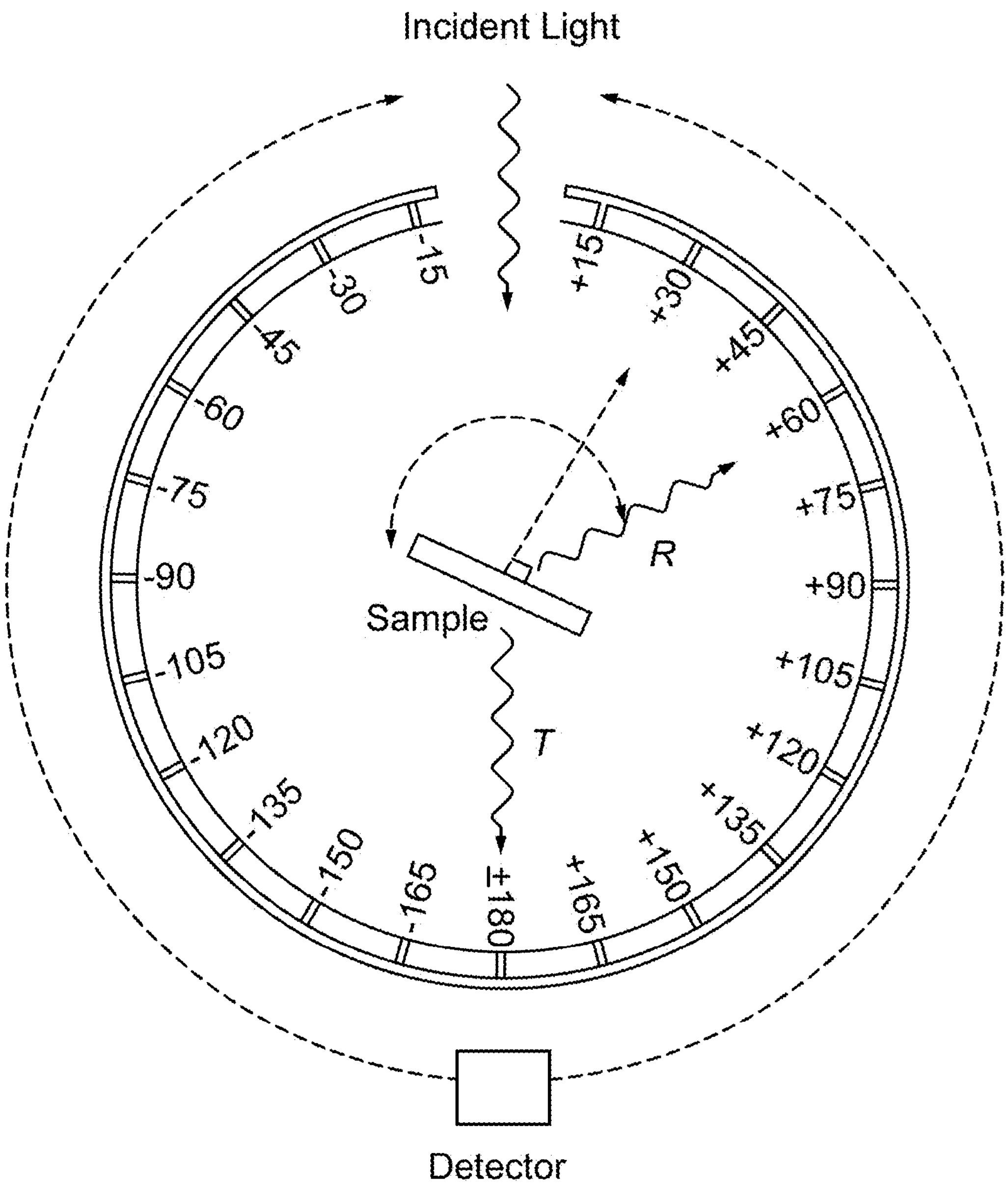
FIG. 2 is the top view of a detector assembly used to measured optical properties (% T, % R, and % A) for an embodiment of the present invention.
Figure 4D:
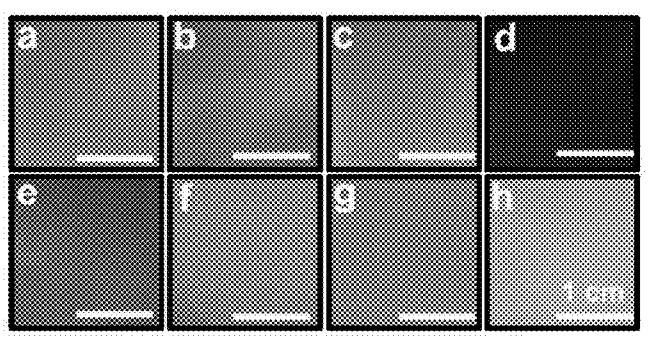
FIG. 4D shows an optical image of one monolayer of Ag nanoparticles on glass slides showing various colors and increasing size from a-h in accordance with an embodiment of the present invention.
Figure 4E:
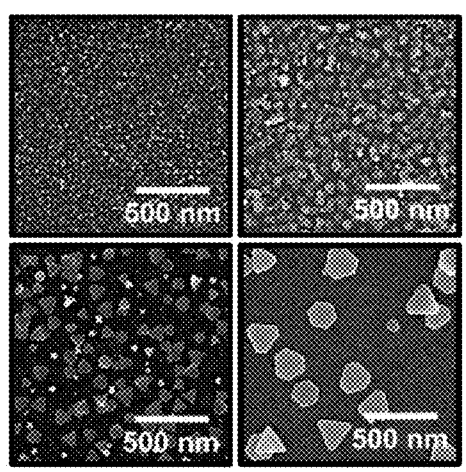
FIG. 4E shows the corresponding representative scanning electron microscope (SEM) image of the deposited Ag nanoparticles in FIG. 4D for an embodiment of the present invention.
Figure 4F:
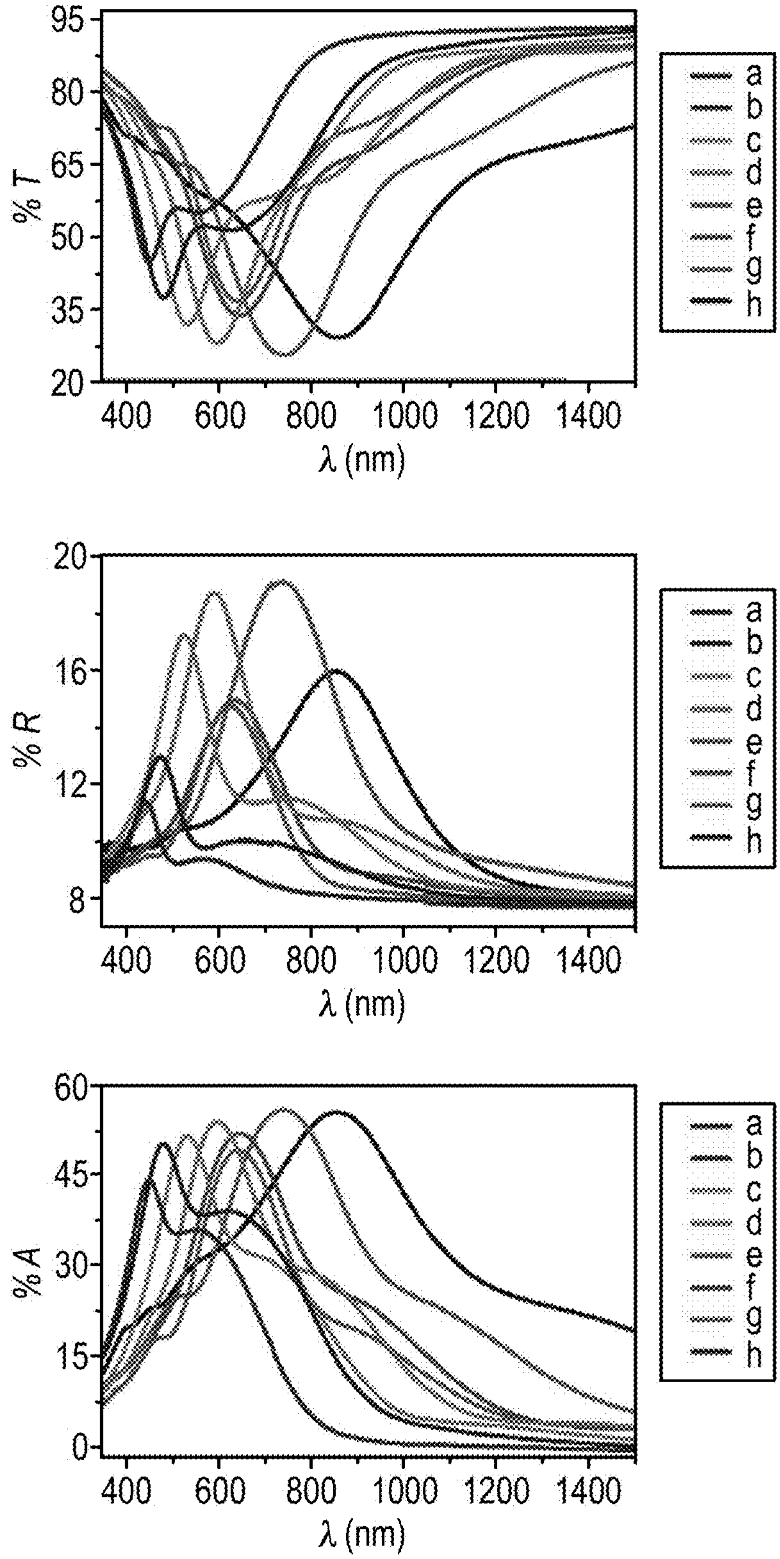
FIG. 4F shows the percentage transmittance, reflectance, and absorptance of the nanoparticles films for an embodiment of the present invention.

In yet other embodiments, a dipping machine may be used. Using a dipping machine, these nanoparticles were deposited on glass slides or substrates using a layer-by-layer technique. FIG. 4D shows the optical image of the glass slides after the nanoparticles were deposited on it. The dipping time (i.e. incubation) was 120 min for these samples and therefore the glass slides have dark colors due to high density of nanoparticles as can be evidenced from the SEM images in FIG. 4E. Based on the nanoparticle sizes, the transmittance spectrum can be seen in FIG. 4F. The optical measurements were taken using Cary Universal Measurement Accessary (UMA) with Cary 5000, the schematic of which is shown in FIG. 2. Here non-polarized light was used. Transmittance profiles revealed that the wavelength of light being stopped by various size of nanoparticles is dependent on their localized surface plasmonic peak position. It was also revealed that the smaller nanoparticles have lower reflectance compared to bigger nanoparticles as can be seen in FIG. 4F. Reflectance of light increases as the size of plate as reported in previous studies. The % absorptance spectrum can be seen in FIG. 4F. These nanoparticles have higher absorptance than reflectance.

Figure 5A:
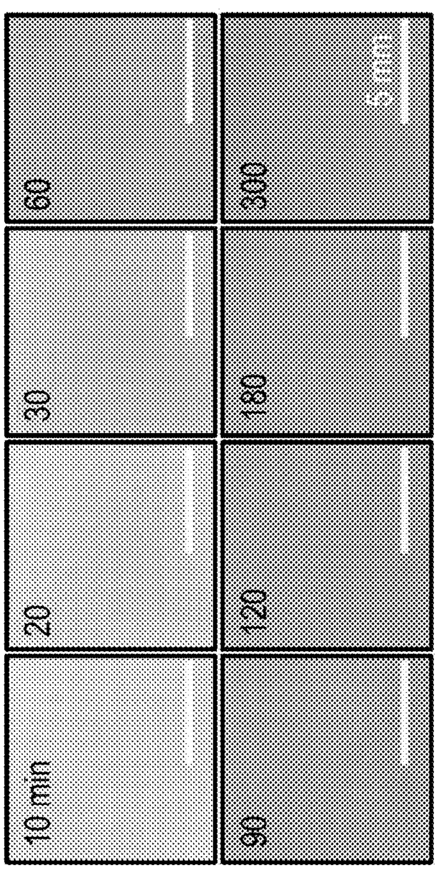
FIG. 5A shows an incubation time study showing the optical image of glass slides which were placed in nanoparticles solution for various times for embodiments of the present invention.
Figure 5B:
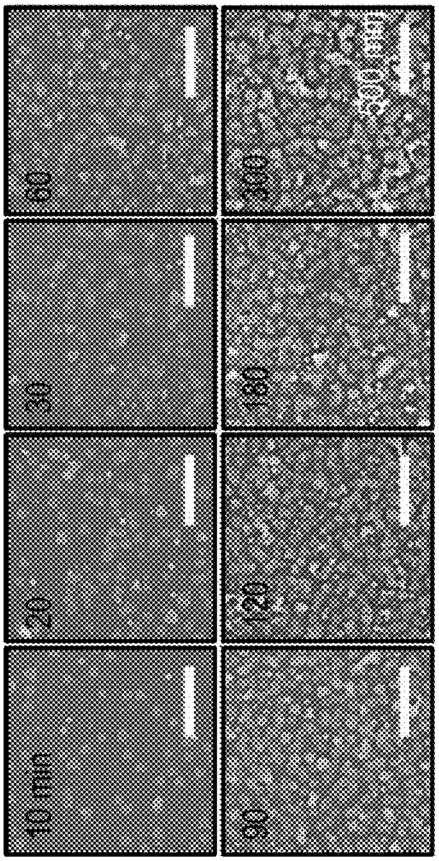
FIG. 5B is a corresponding SEM images of the deposited nanoparticles on glass slides shown in FIG. 5A for an embodiment of the present invention.
Figure 5C:
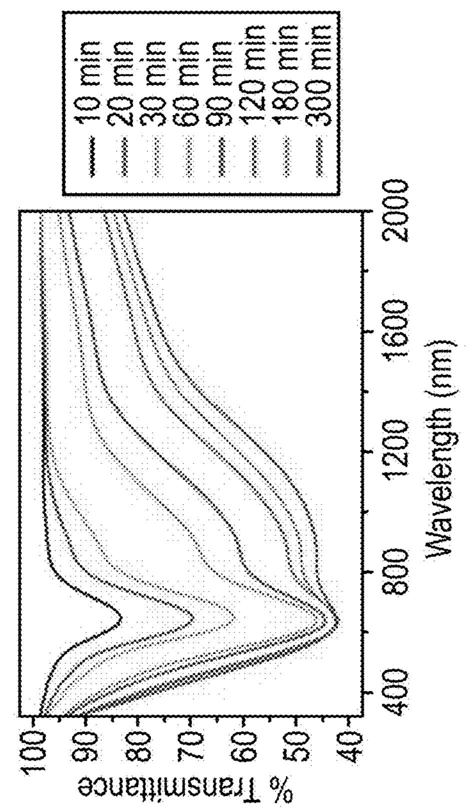
FIGS. 5C and 5D show percentage transmittance and reflectance of the corresponding samples for an embodiment of the present invention.
Figure 5D:
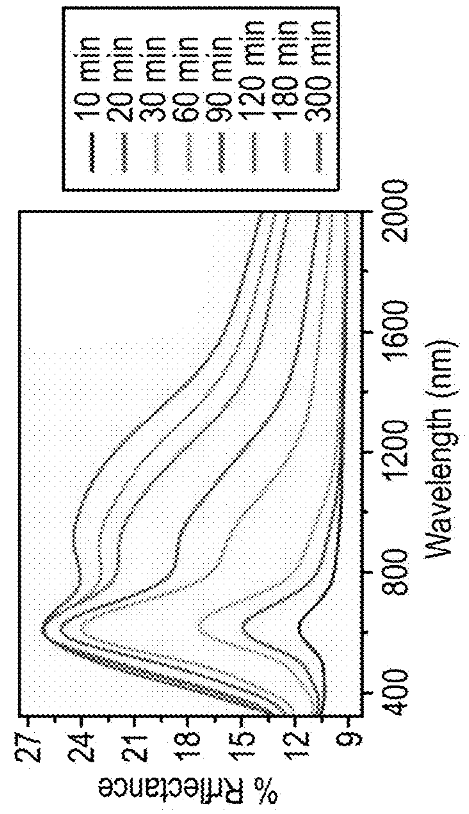
Figure 6:
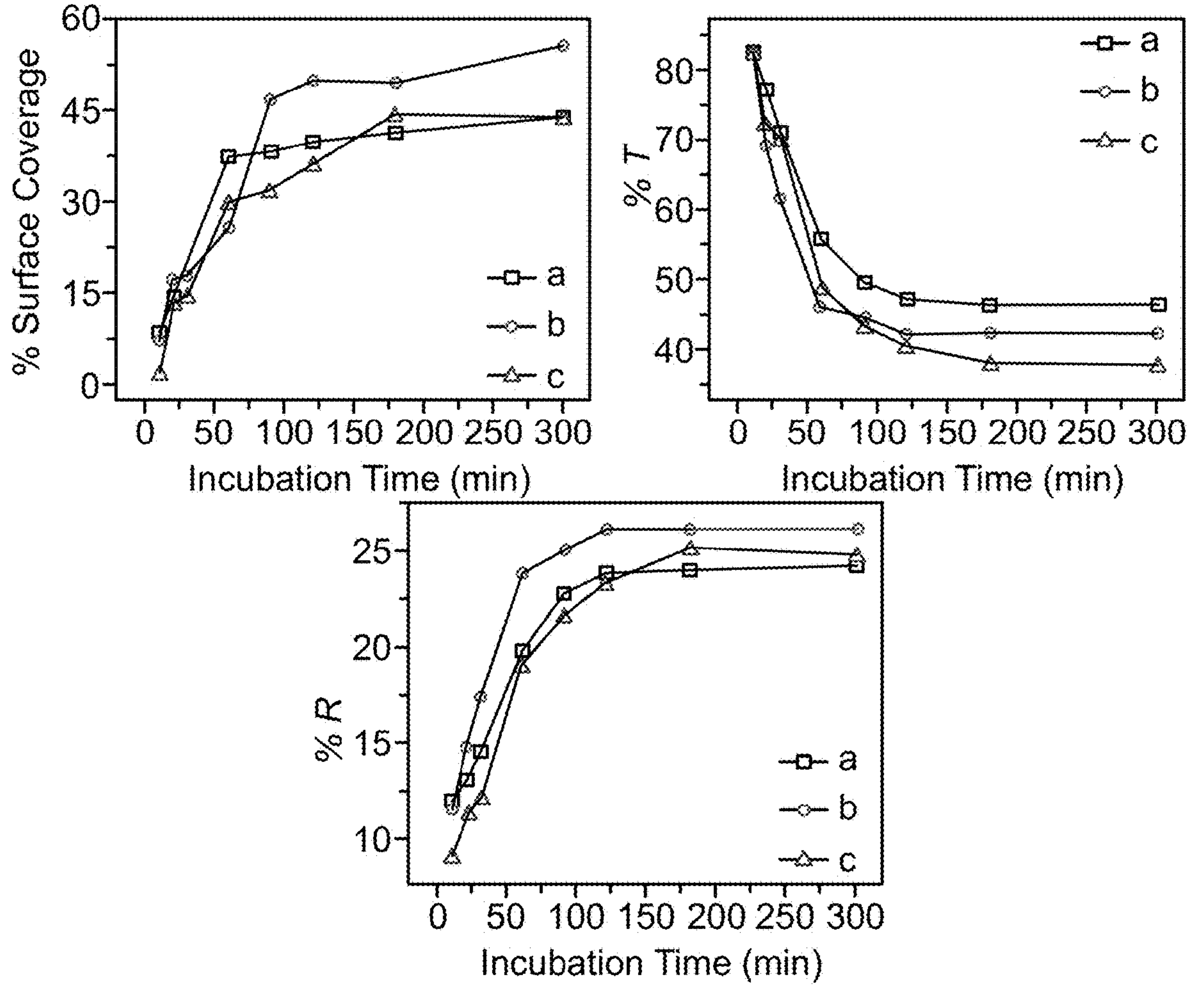
FIG. 6 depicts the maximum percentage transmittance plotted for all the different incubation times shown in FIG. 5 at different angles.
Figure 7:
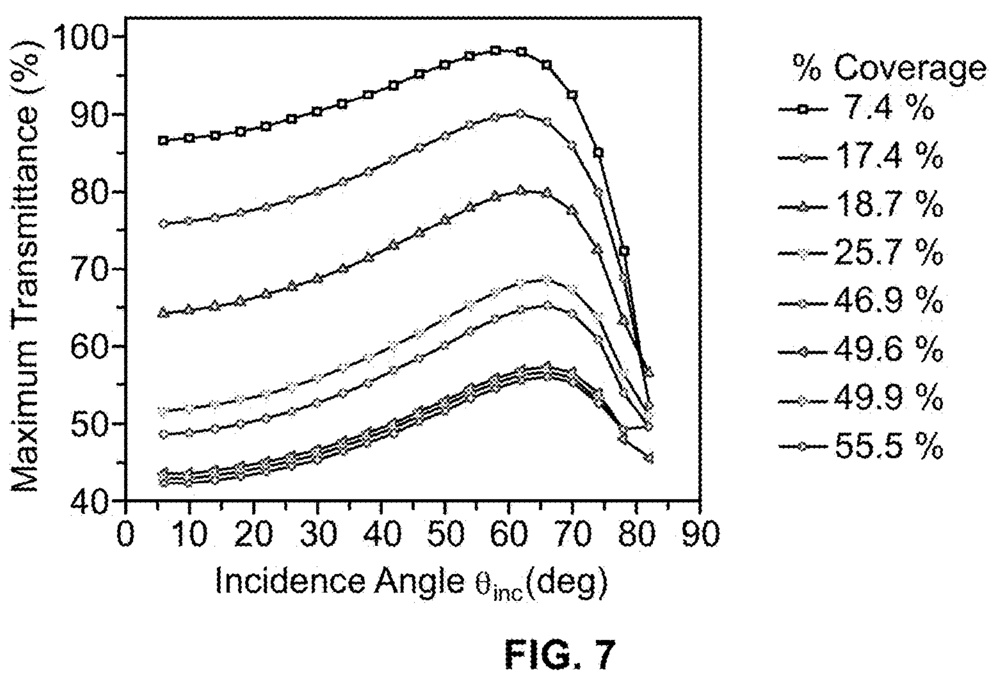
FIG. 7 shows the percentage coverage, transmittance, and reflectance as a function of incubation time for an embodiment of the present invention for three different sizes of nanoparticles.

Incubation time also plays a role in using polyelectrolytes for depositing plasmonic nanoparticles. FIG. 5A shows the optical image of the nanoparticles deposited on substrates for different time intervals. The color becomes more and more intense as the incubation time is increased. Corresponding FE-SEM image in FIG. 5B revealed that the nanoparticles density increases from 10-300 min. Physically from the optical image and SEM images it can be witnessed that the films become saturated around 120 min but looking at the % transmittance (% T) and % reflectance (% R) in FIG. 5C, which show a shoulder peak increasing. The shoulder peak appearance may be attributed to the interparticle spacing being decreased and in some cases overlapping, leading to localized surface plasmon coupling (LSPC) effect. Hence as the incubation time increases more and more particles come closer to each other and overlap leading to this coupling phenomena. The % transmittance also reveals that as the density of nanoparticles increases, more light is being stopped at the localized surface plasmon resonance (LSPR) of nanoparticles. A point is reached where the maximum transmittance at the LSPR of nanoparticles stops while the coupling effect keeps increasing. Similarly, % reflectance increases as the density of the nanoparticles increases. The coupling effect also leads to reflectance of higher wavelength light as can be witnessed in FIG. 5C. The maximum transmittance of sample 5 is plotted as function of incidence angle in FIG. 6. The surface coverage, % T, and % R is plotted as a function of incubation time for three different sizes (a<b<c) in FIG. 7. It can be quantitatively seen that around 90 min the surface starts to saturate with no significant increase in the surface coverage. The maximum surface coverage is around 55% for FIG. 5, 300 min sample and hence still 45% of the surface is empty which can be useful for light transmittance.

Figure 8A:
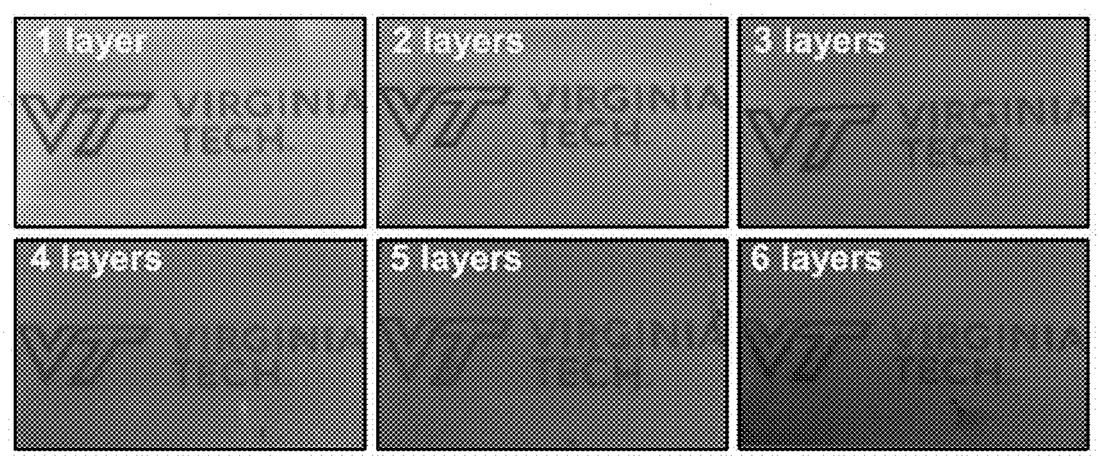
FIG. 8A is an optical image of glass slides with selected samples of Ag nanoparticles having different number of layers deposited on top of each other depicting a more dense color as the number of layer increases.
Figure 8B:
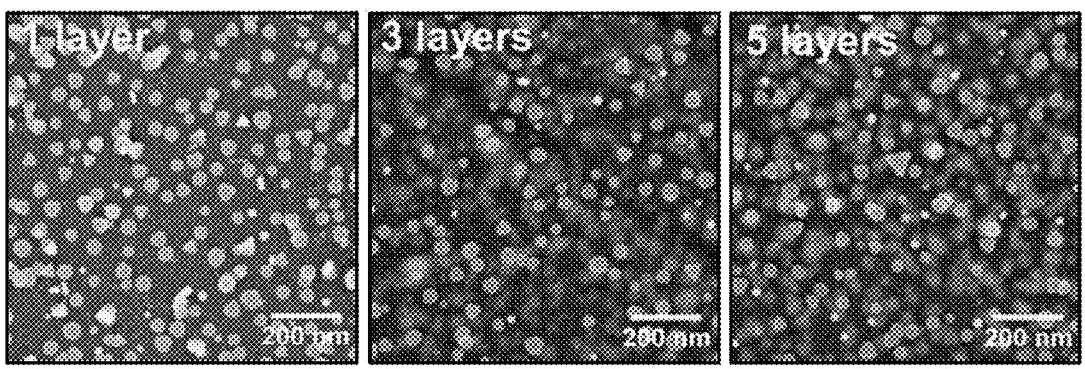
FIG. 8B is a corresponding SEM images of selected layers shown in FIG. 8A where the top layer is not coated with polymer.
Figure 8C:
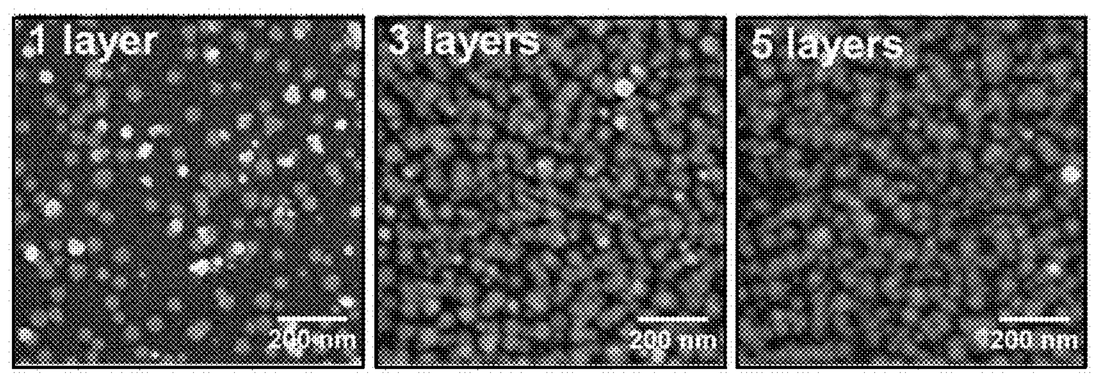
FIG. 8C is a corresponding SEM images of selected layers (FIG. 8B) where the top layer is coated with a thin polymer layer.
Figure 8D:
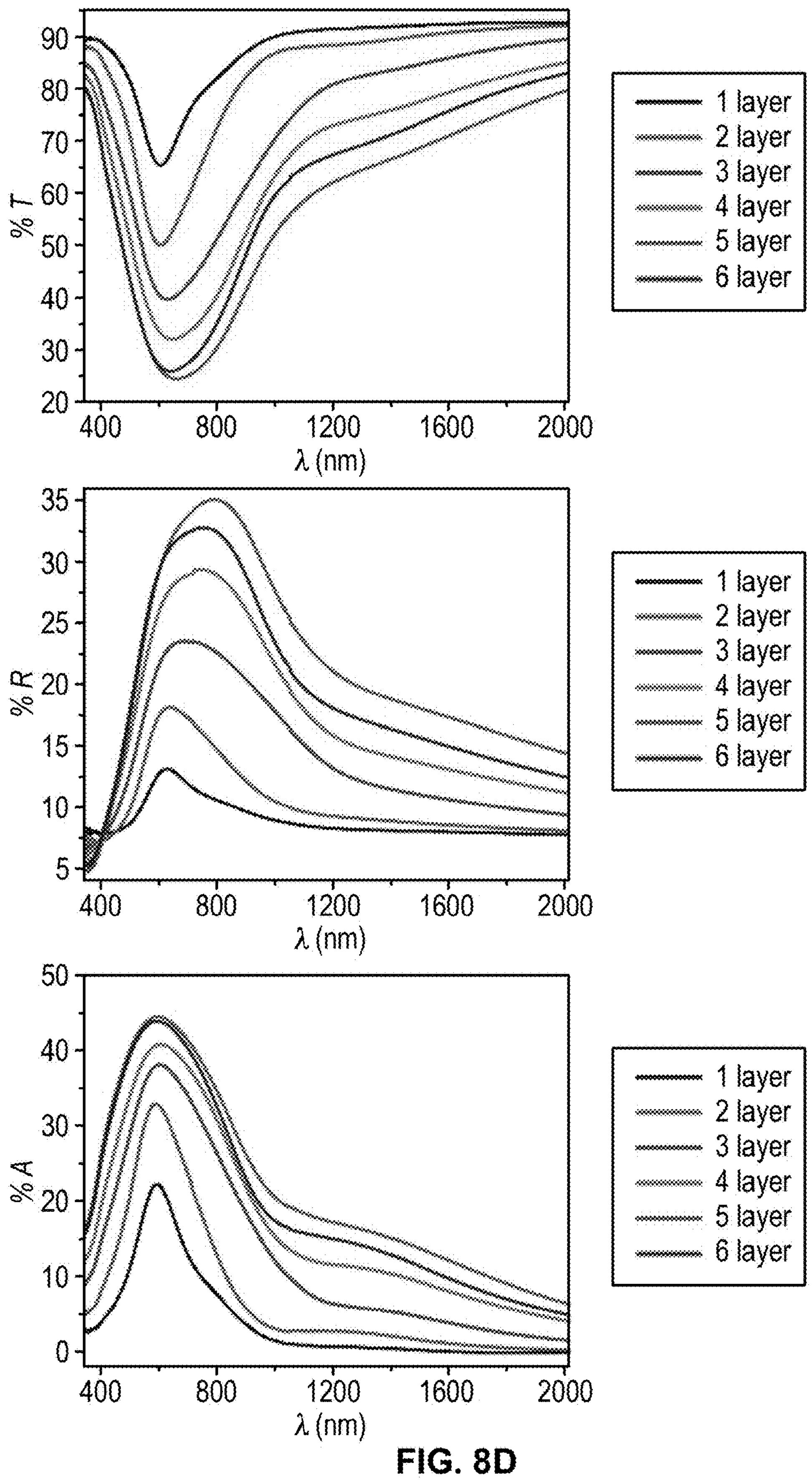
FIG. 8D is percentage transmittance, reflectance, and absorptance respectively through Ag nanoparticles films having various number of layers.

Decreasing transmittance can be done either through using a longer incubation time or using multiple layers of nanoparticles on top of each other. FIG. 8A show optical images of multilayer samples. Their corresponding SEM images for selected samples are also shown in FIGS. 8B and 8C respectively. PMMA is used as a spacer between two layers of nanoparticles which helps in keeping the nanoparticles apart and helps in avoiding undesirable coupling. If PMMA is not used and only PAH-PAA are used, then we will see a lot of undesirable coupling effects. Decreasing transmittance and increasing reflectance and absorptance for a LSPR are shown in FIG. 8D. Thus, increasing the number of layers also leads to blocking other higher wavelengths of light.

Figure 9A:
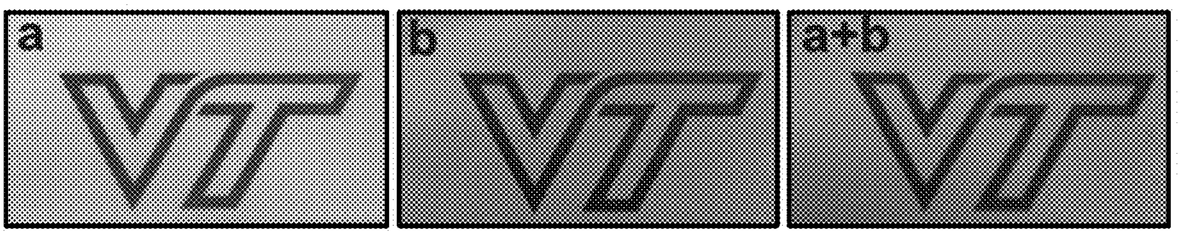
FIG. 9A is an optical image of two different size of nanoparticles where is a represents bigger nanoplates, b represents smaller nanoplates, and a+b represents combination of these layers of particles.
Figure 9B:
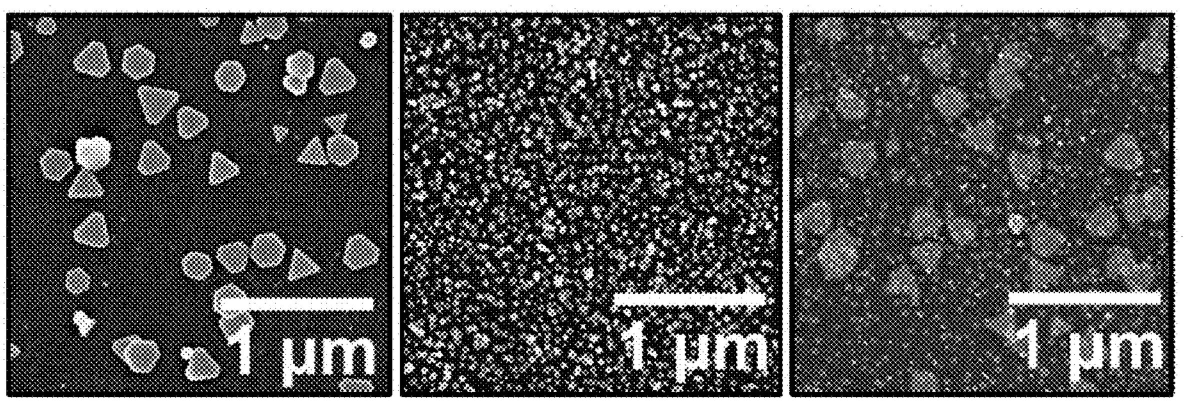
FIG. 9B represents the corresponding SEM images of FIG. 9A.
Figure 9C:
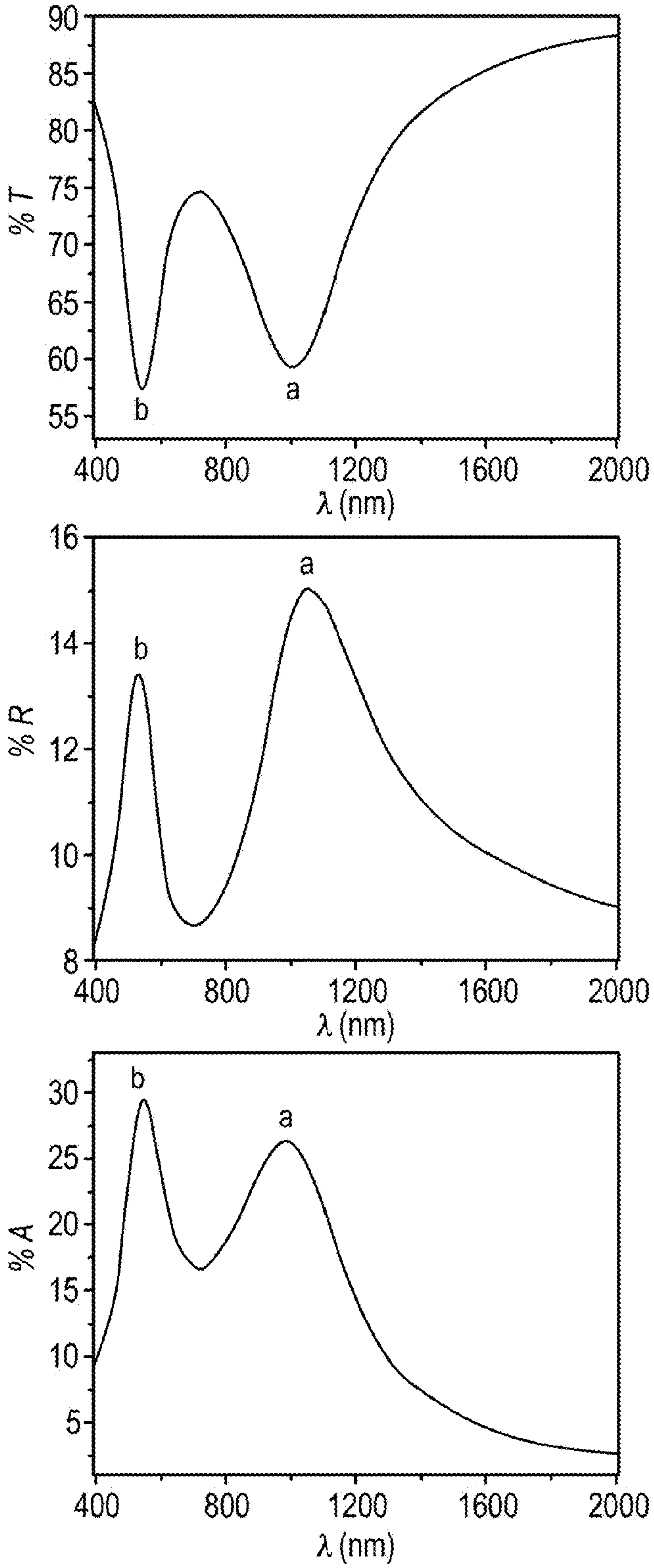
FIG. 9C shows the percentage transmittance, reflectance, and absorptance of the two layers of different sizes of nanoparticles (a+b).

This multiple layer strategy can also be applied to prepare samples with two different types of nanoparticles. For example, shown in FIG. 9 is an example of big nanoparticles in NIR range which are useful for heat reflecting windows and another layer of smaller nanoparticles absorbing in visible region can be added for aesthetic purposes. This filtering ability can be applied to many useful applications. The nanoparticles are well separated in SEM images in FIG. 9B and the plasmonic peaks are well separated in FIG. 9C.

Figure 10A:
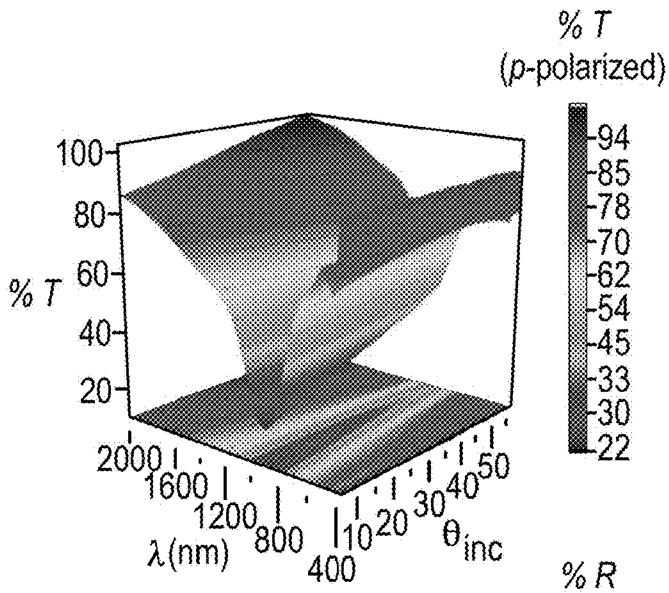
FIGS. 10A, 10B, 10C, 10D, 10E and 10F are 3D contour plots for p- and s-polarized light passing through a composite film of Ag nanoparticle and PAH. The heat maps show the intensity of light wavelengths stopped most and defines the range.
Figure 10B:
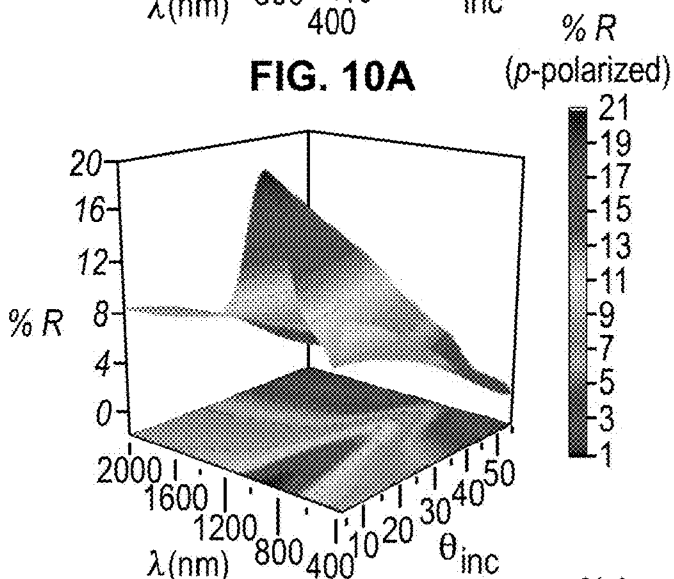
Figure 10C:
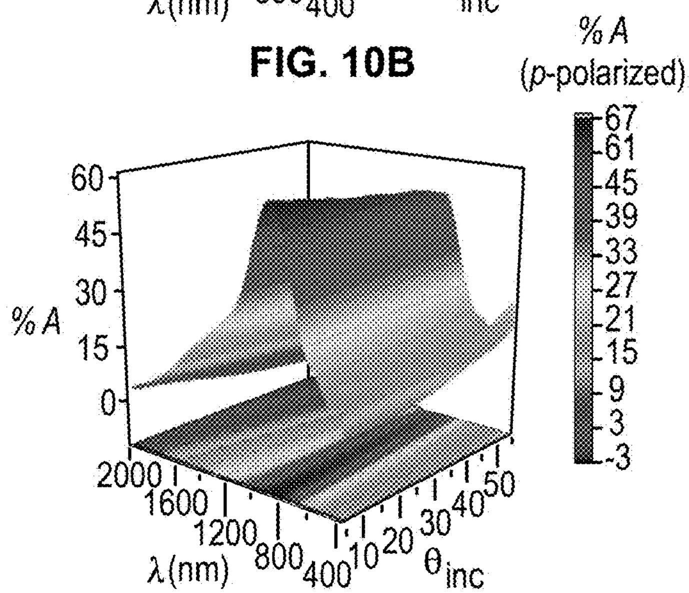
Figure 10D:
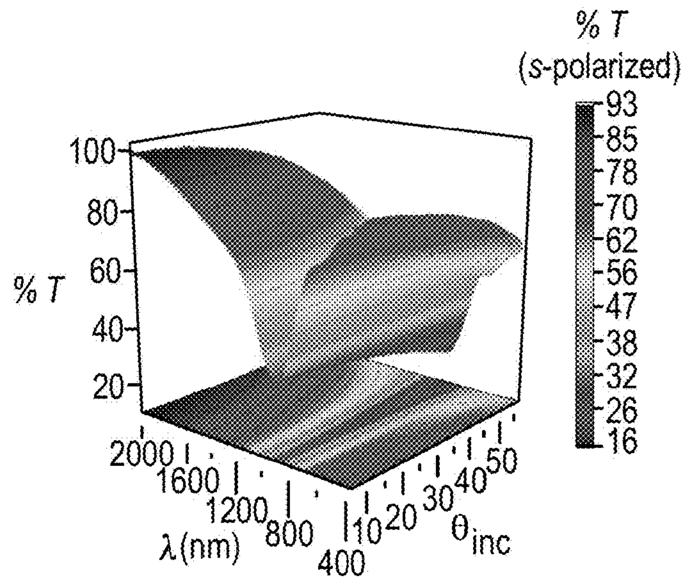
Figure 10E:
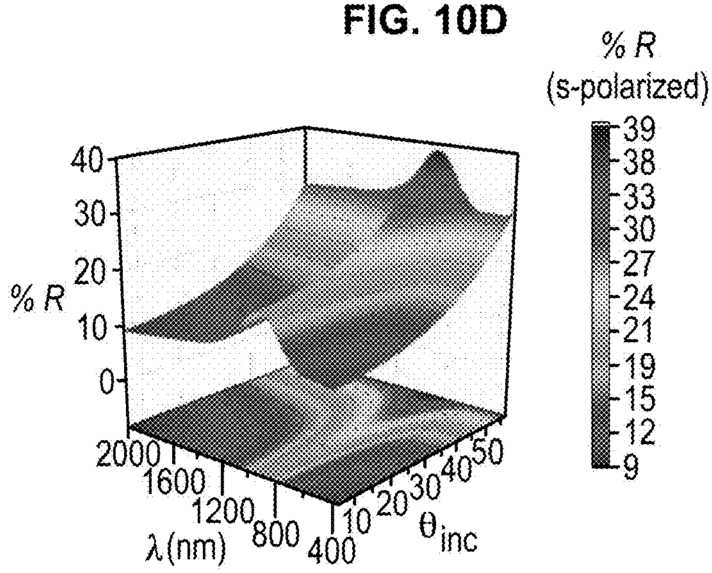
Figure 10F:
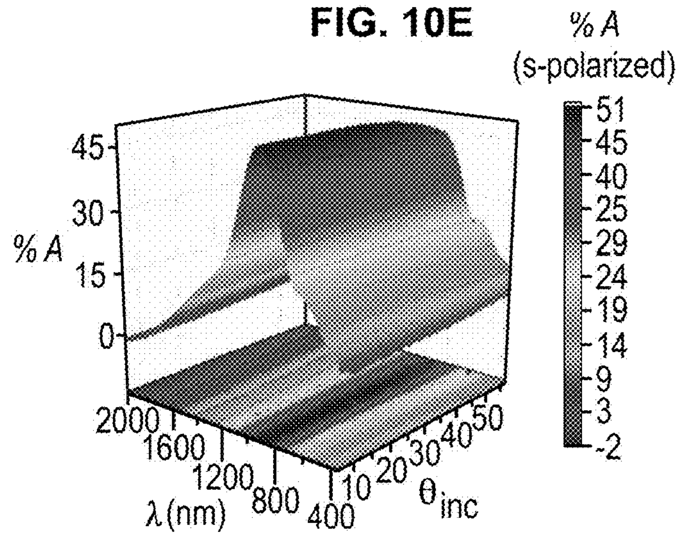

In coating applications, it is important to know the absorptance of the films as that defines the color being imparted. Therefore, polarization dependence of the optical properties of these films was plotted in FIGS. 10A-10F. In FIGS. 10A-C, p-polarized was used and the transmittance, reflectance, and absorptance was measured at different angles from 6° to 58° with 1° increment. Similarly, s-polarized was plotted in FIGS. 9D-F. These 3D contour plots gave an idea into the exact range of wavelength where the light is not transmitted and is either reflected or absorbed.

Materials and Methods

Materials: Silver nitrate (>99.9999%) (204390), sodium borohydride (>99.99%) (480886), sodium citrate tribasic dihydrate (>99.0%) (S4641), ascorbic acid (>99.0%) (A5960), poly(allylamine hydrochloride) (PAH) (average $M_w$–17,500 g mol") (283215), poly(acrylic acid) ((PAA) ($M_v$–450,000 g mol"), and poly(sodium 4-styrenesulfonate) (PSSS) (average $M_w$–1,000 Kg $mol^{-1}$) (434574) were purchased from Sigma-Aldrich and used as received. Plain glass microscope slides (25×75 mm) (Cat. No. 12-544-4) were bought from Fisher Scientific and used as the substrate or article. Other substrates of various materials, sizes and shapes may also be used. Nanoparticle synthesis was carried out in ultrapure deionized (DI) water obtained from Thermo Scientific™ Barnstead™ GenPure™ Pro water purification system at 17.60 MQ-cm, while rinsing steps of the glass slides after deposition in polyelectrolyte or nanoparticles solutions were carried out with DI water.

Synthesis of Ag Nanoparticles: Ag nanoparticles were synthesized following a seed-mediated method. Ag seeds may be synthesized as follows. First, 0.25 mL of PSSS (5 mg/mL) and 0.3 mL of ice-cold $NaBH_4$ (10 mM) aqueous solutions were added to a 5 mL solution of sodium citrate (2.5 mM) under constant stirring. Afterwards, 5 mL of $AgNO_3$ (0.5 mM) was added to the solution at a rate of 2 mL/min using Cole-Parmer syringe pump (Cat. No. 78-8210C). The seed solution was then immediately covered in an Al foil to prevent from light exposure. After 5 min, the stirring was stopped.

To synthesize Ag nanoparticles, 1.5 mL of 10 mM ascorbic acid solution was added to 254 mL of water under vigorous stirring, followed by the addition of a certain amount of seed solutions (ranged from 200 to 2000 μL) to prepare nanoparticles of various sizes. Afterwards, 6 mL of $AgNO_3$ (5 mM) solution was added to the mixture at a rate of 2 mL/min. The solution changed color indicating the growth of Ag nanoparticles. Finally, 10 mL of sodium citrate (25 mM) solution was added to the product solution to stabilize the nanoparticles. To obtain large Ag nanoparticles with a resonance peak above 800 nm, small Ag nanoplate seeds were prepared by the addition of 75 μL of AA and 10 μL of Ag spherical seeds to 10 mL of water. This was followed by the addition of 3 mL of 0.5 mM $AgNO_3$ at 1 mL/min. Once the nanoparticles were prepared they were used as seeds to be grown into larger nanoplates. To prepare large Ag nanoparticles 150 μL of AA was added to 20 mL of water followed by varying amounts from 0.5-1 mL of the Ag nanoplates were added to this solution. Then 6 mL of 0.5 mM of $AgNO_3$ was added to this mixture at a rate of 2 mL/min. Once the synthesis was complete, 1 mL of sodium citrate was added to stabilize the nanoparticles.

Transmission Electron Microscopy (TEM): 5-10 μL of Ag nanoparticles aliquots were drop-casted on copper grids to prepare TEM samples. The samples were dried overnight at room temperature and imaged using Philips EM420 transmission electron microscope at an accelerating voltage of 120 keV.

Layer-by-Layer Fabrication of Ag Nanoparticles and Polyelectrolytes: Thin films of nanoparticle-polymer nanocomposites were prepared using a layer-by-layer (LbL) technique using dipping machine. First, two dilute solutions of cationic PAH and anionic PAA polyelectrolytes with a concentration of 10 mM (based on the monomer) were prepared in DI water. The pH of both solutions was brought to neutral (i.e. 7) by adding either hydrochloric acid (HCl) or sodium hydroxide (NaOH). The neutral pH helped in not degrading the nanoparticles. Two 120 mL beakers were filled with 100 mL PAH solution and 100 mL colloidal solution of as-synthesized Ag nanoparticles for deposition. Six additional beakers were filled with DI water for rinsing. All eight beakers were placed on the rotating stage of a dipping machine. The PAH solution and Ag nanoparticles were separated by three beakers of DI water. The glass slides were dipped in the PAH solution for 5 min which led to the deposition of positively charged PAH onto the glass slides due to electrostatic interaction. To remove any potentially accumulated polyelectrolyte, the glass slides were rinsed in DI water for 40 sec and this process was repeated three times. After rinsing, the glass slides were immersed in the colloidal solution of Ag nanoparticles for various amount of time (10-300 min). Ag nanoparticles had negatively charged surface due to adsorbed sodium citrate molecules therefore the nanoparticles were able to adhere onto the positively charged PAH layers attached on the glass slides. Afterwards, the glass slides were rinsed three times in DI water for 30 sec each. The deposition cycle was repeated as needed.

Random Orientation of Ag Nanoparticles: Ag nanoparticles in aqueous medium were centrifuged at 10000 rpm for 30 min and redispersed in DMF. The nanoparticles were functionalized with 1 wt. % thiol-terminated poly (methyl methacrylate) (PMMA-SH) in DMF for 24 h and centrifuged again at 10000 rpm for 30 min. Supernatant was removed and the nanoparticles were redispersed in 5 wt. % PMMA-SH in Toluene. The nanocomposite films were casted on the glass surface and then kept in fume hood to vaporize the solvent for 24-48 h.

Field Emission Scanning Electron Microscopy (FE-SEM): To image the nanoparticles on glass slides, the samples were coated with high resolution Iridium with a thickness of 1.5-3 nm. They were then imaged using SEM where the WD was 4 mm, EHT was 10 kV and InLens detector was used.

Optical Measurement using UV-Visible Near-Infrared (NIR) Spectroscopy with Cary Universal Measurement Accessory (UMA): To perform optical measurement including % absorptance, transmittance, and reflectance, we used universal measurement accessary (UMA) with Agilent Cary 5000 UV-visible-NIR spectrophotometer. A schematic of the setup is shown in FIG. 2. Here the glass slide with nanoparticles was mounted on the stage where the full light beam could pass through it. For FIGS. 4 and 5 the sample angle was 6° for % reflectance and % transmittance. In FIG. 3 the angle was changed from 6° to 75° with 1° increment step and the data was plotted in Origin.

Figure 11A:
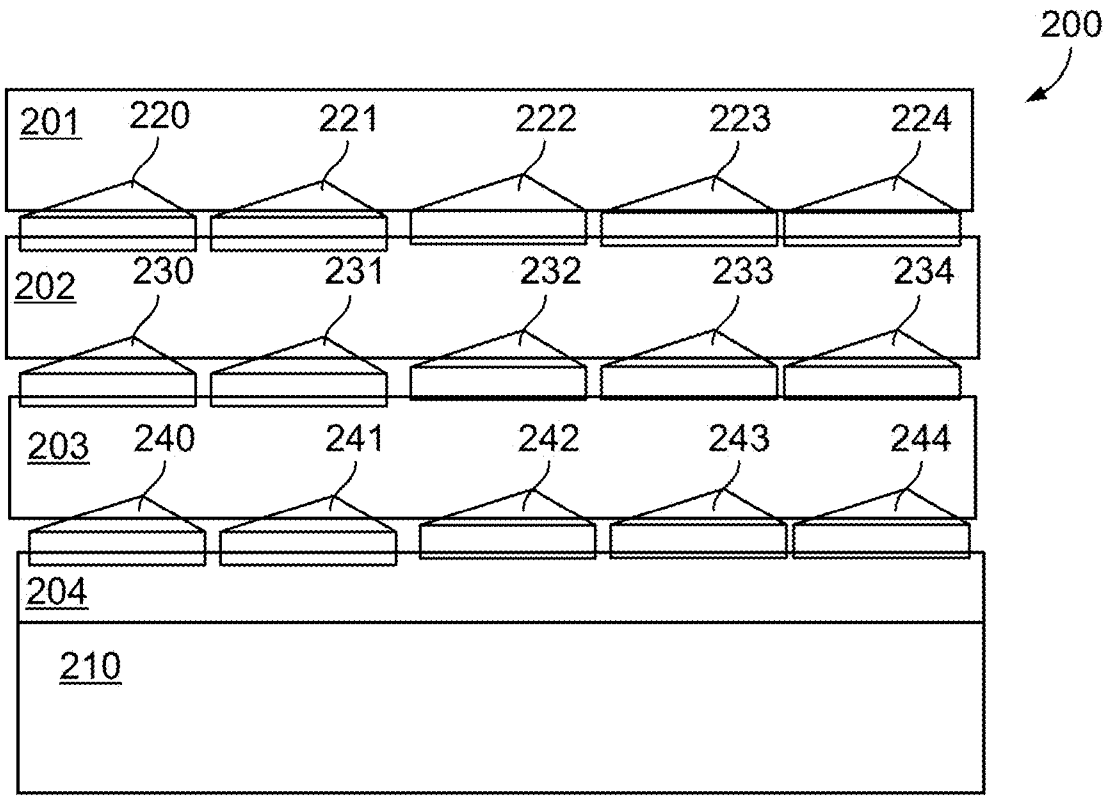
FIGS. 11A and 11B illustrate an article having multiple layers of plasmonic nanoparticles.
Figure 11B:
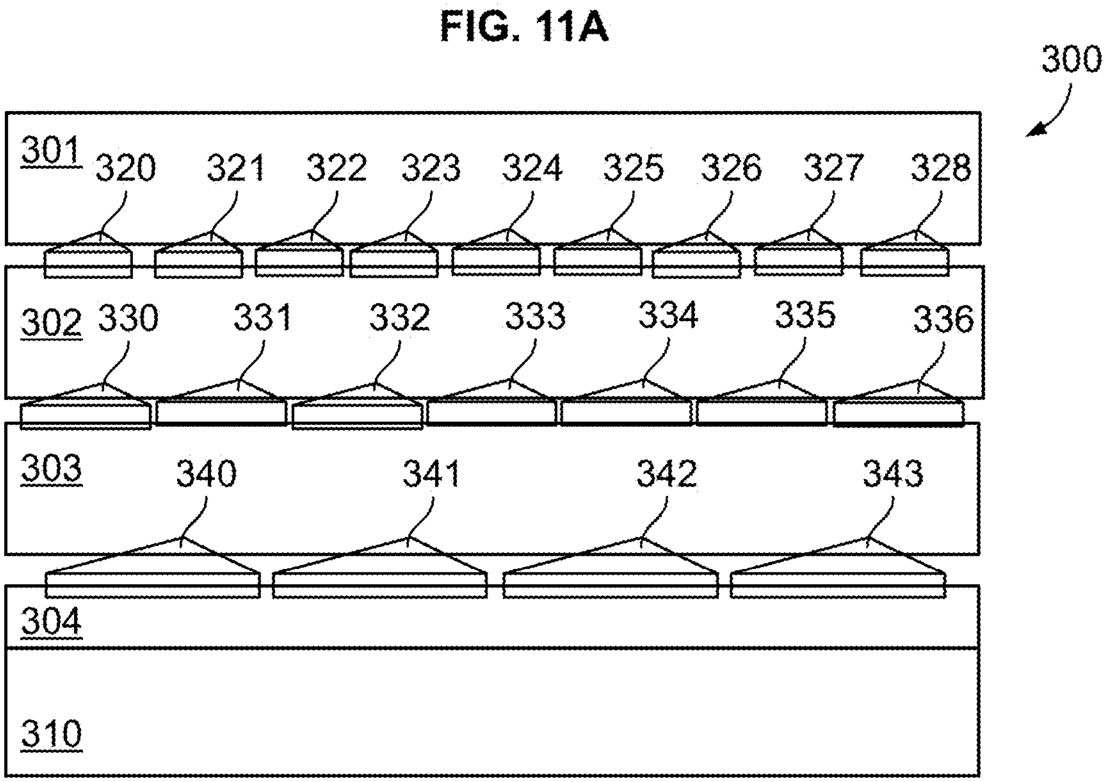

FIGS. 11A and 11B illustrate other embodiments of the present involving an article of manufacture. As shown in FIG. 11A, article 200 is comprised of a plurality of layers 201-204 which may optionally be located on substrate 210. Sandwiched between layers 200-201 are layers of plasmonic nanoparticles 220-224, 230-234 and 240-244.

Plasmonic nanoparticles 220-224, 230-234 and 240-244 may be of the same size as shown. In addition, the plasmonic nanoparticles may be configured as described above. For example, plasmonic nanoparticles 220-224, 230-234 and 240-244 may be randomly orientated as shown in FIG. 3A or may have the same orientation as shown in FIG. 3D.

In other embodiments, plasmonic nanoparticles 220-224, 230-234 and 240-244 may have different plasmon resonance wavelengths, the same plasmon resonance wavelengths, or combinations thereof. In yet other embodiments, each layer of article 200 has plasmonic nanoparticles configured to absorb, reflect, and transmit light as well as combinations thereof. In yet other embodiments, the layers of plasmonic nanoparticles of article 200 are orientated the same, randomly orientated or are combinations thereof.

Plasmonic nanoparticles 220-224, 230-234 and 240-244 may be comprised of the same metal, different metals, the same metal oxide or different metal oxides as well as combinations thereof. Plasmonic nanoparticles 220-224, 230-234 and 240-244 may also have different surface densities or the same surface densities.

In other embodiments, layers 201-204 of article 200 may have different thicknesses, the same thicknesses or combinations thereof. In other embodiments, the dielectric material is a polymer, metal oxides as well as combinations thereof.

As shown in FIG. 11B, article 300 is comprised of a plurality of layers 301-304 which may optionally be located on substrate 310. Sandwiched between layers 300-301 are layers of plasmonic nanoparticles 320-328, 330-336 and 340-343.

Plasmonic nanoparticles 320-328, 330-336 and 340-343 may be of varying sizes as shown. In addition, the plasmonic nanoparticles may be configured as described above. For example, plasmonic nanoparticles 320-328, 330-336 and 340-343 may be randomly orientated as shown in FIG. 3A or may have the same orientation as shown in FIG. 3D.

In other embodiments, plasmonic nanoparticles 320-328, 330-336 and 340-343 may have different plasmon resonance wavelengths, the same plasmon resonance wavelengths, or combinations thereof. In yet other embodiments, each layer of article 300 has plasmonic nanoparticles configured to absorb, reflect, and transmit light as well as combinations thereof. In yet other embodiments, the layers of plasmonic nanoparticles of article 300 are oriented the same, randomly oriented or are combinations thereof.

Plasmonic nanoparticles 320-328, 330-336 and 340-343 may be comprised of the same metal, different metals, the same metal oxide or different metal oxides as well as combinations thereof. Plasmonic nanoparticles 320-328, 330-336 and 340-343 may also have different surface densities or the same surface densities.

In other embodiments, layers 301-304 of article 300 may have different thicknesses, the same thicknesses or combinations thereof. In other embodiments, the dielectric material is a polymer, metal oxides as well as combinations thereof.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of making an article having plasmonic nanoparticles, the method comprising:

depositing a polyelectrolyte layer on a substrate;

depositing a first plasmonic nanoparticle layer on said polyelectrolyte layer, said first plasmonic nanoparticle layer having first plasmonic nanoparticles oriented parallel to said polyelectrolyte layer; and depositing a second plasmonic nanoparticle layer on said polyelectrolyte layer, said second plasmonic nanoparticle layer having second plasmonic nanoparticles randomly oriented in multiple directions to said polyelectrolyte layer.

2. The method of claim 1, wherein said first plasmonic nanoparticles or said second plasmonic nanoparticles are prismatic in shape.

3. The method of claim 1, further comprising growing said first plasmonic nanoparticles or said second plasmonic nanoparticles into prismatic shapes before being deposited onto said polyelectrolyte layer.

4. The method of claim 1, wherein said first plasmonic nanoparticles are a made of a first metal and said second plasmonic nanoparticles are made of a second metal.

5. The method of claim 1, wherein said first plasmonic nanoparticles have a first plasmonic resonance wavelength and said second plasmonic nanoparticles have a second plasmonic resonance wavelength.

6. The method of claim 1, wherein said polyelectrolyte layer is made of a cationic polymer.

7. The method of claim 6, wherein said cationic polymer is polyallylamine hydrochloride.

8. The method of claim 1, wherein said polyelectrolyte layer is made of an anionic polymer.

9. The method of claim 8, wherein said anionic polymer is polyacrylic acid.

10. The method of claim 1, wherein one of said first plasmonic nanoparticles and said second plasmonic nanoparticles is made of metal and another one of said first plasmonic nanoparticles and said second plasmonic nanoparticles is made of a metal oxide.

11. The method of claim 1, wherein depositing the first plasmonic nanoparticle layer on said polyelectrolyte layer comprises electrostatically depositing a solution of gold nanoparticles, the gold nanoparticles comprising surfaces negatively charged by absorbed sodium citrate.

12. A method of making an article having plasmonic nanoparticles, the method comprising:

depositing a first dielectric layer on a substrate;

depositing a first plasmonic nanoparticle layer on said first dielectric layer, said first plasmonic nanoparticle layer having first plasmonic nanoparticles made of a metal;

depositing a second dielectric layer on said first plasmonic nanoparticle layer; and depositing a second plasmonic nanoparticle layer on said second dielectric layer, said second plasmonic nanoparticle layer having second plasmonic nanoparticles made of a metal oxide, wherein at least one of said first dielectric layer or said second dielectric layer comprises a polymer.

13. The method of claim 12, wherein said first plasmonic nanoparticles or said second plasmonic nanoparticles are prismatic in shape.

14. The method of claim 12, further comprising growing said first plasmonic nanoparticles or said second plasmonic nanoparticles into prismatic shapes before being deposited.

15. The method of claim 12, wherein said first plasmonic nanoparticles have a first plasmonic resonance wavelength and said second plasmonic nanoparticles have a second plasmonic resonance wavelength.

16. The method of claim 12, wherein said first plasmonic nanoparticles are oriented parallel to said first dielectric layer.

17. The method of claim 16, wherein said second plasmonic nanoparticles are randomly oriented in multiple directions to said second dielectric layer.

18. The method of claim 12, wherein depositing the first plasmonic nanoparticle layer on said first dielectric layer comprises electrostatically depositing a solution of gold nanoparticles, the gold nanoparticles comprising surfaces negatively charged by absorbed sodium citrate.

19. A method of making an article having plasmonic nanoparticles, the method comprising:

depositing a first dielectric layer on a substrate;

depositing a first plasmonic nanoparticle layer on said first dielectric layer, said first plasmonic nanoparticle layer having first plasmonic nanoparticles made of a metal;

depositing a second dielectric layer on said first plasmonic nanoparticle layer; and depositing a second plasmonic nanoparticle layer on said second dielectric layer, said second plasmonic nanoparticle layer having second plasmonic nanoparticles made of a metal oxide, wherein at least one of said first dielectric layer or said second dielectric layer comprises a metal oxide.

* * * * *